United States Patent
Fries et al.

(10) Patent No.: US 7,778,959 B2
(45) Date of Patent: Aug. 17, 2010

(54) PROTECTING STORAGES VOLUMES WITH MOCK REPLICATION

(75) Inventors: Robert M. Fries, Redmond, WA (US); Asaf Kariv, Redmond, WA (US); Shiraz M. Somji, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 954 days.

(21) Appl. No.: 11/298,816

(22) Filed: Dec. 9, 2005

(65) Prior Publication Data

US 2007/0136395 A1 Jun. 14, 2007

(51) Int. Cl.
*G06F 7/00* (2006.01)
(52) U.S. Cl. ...................................... 707/609
(58) Field of Classification Search ................ None
See application file for complete search history.

(56) References Cited

U.S. PATENT DOCUMENTS

| | | | | |
|---|---|---|---|---|
| 5,235,690 A | * | 8/1993 | Beardsley et al. | 711/113 |
| 5,386,536 A | * | 1/1995 | Courts et al. | 711/136 |
| 5,566,315 A | * | 10/1996 | Milillo et al. | 711/113 |
| 5,581,736 A | * | 12/1996 | Smith | 711/170 |
| 5,713,008 A | * | 1/1998 | Falkner | 711/118 |
| 5,890,154 A | | 3/1999 | Hsiao et al. | |
| 6,032,227 A | * | 2/2000 | Shaheen et al. | 711/129 |
| 6,088,764 A | * | 7/2000 | Shyam et al. | 711/112 |
| 6,092,087 A | | 7/2000 | Mastors | |
| 6,408,406 B1 | * | 6/2002 | Parris | 714/41 |
| 6,591,334 B1 | * | 7/2003 | Shyam et al. | 711/112 |
| 6,604,183 B2 | * | 8/2003 | Beaven et al. | 711/170 |
| 6,625,623 B1 | * | 9/2003 | Midgley et al. | 707/204 |
| 6,704,755 B2 | * | 3/2004 | Midgley et al. | 707/204 |
| 6,889,243 B1 | | 5/2005 | Hondou et al. | |
| 6,925,476 B1 | | 8/2005 | Multer et al. | |
| 7,484,119 B2 | * | 1/2009 | Fisher et al. | 714/15 |
| 2001/0018731 A1 | * | 8/2001 | Fujii et al. | 711/170 |
| 2002/0138762 A1 | | 9/2002 | Horne | |
| 2002/0152284 A1 | * | 10/2002 | Cambray et al. | 709/218 |

(Continued)

OTHER PUBLICATIONS

Micromuse Netcool Solutions: Netcool/System Service Monitors White Paper [online][retrieved on Feb. 3, 2006]. Retrieved from the Internet: URL: http://www.micromuse.com/downloads/pdf_lit/wp_SSMs.pdf.

(Continued)

*Primary Examiner*—Hung Q Pham
*Assistant Examiner*—Hubert Cheung
(74) *Attorney, Agent, or Firm*—Workman Nydegger

(57) ABSTRACT

A file server and a data protection manager server can work in tandem to efficiently backup protected volumes, and also provide efficient access to replicas of the protected volumes. In one implementation, a file server institutes a mock replication process, in which the file server observes data associated with write operations in one or more protected volumes. Appropriate volume allocation information can then be determined, which can be used to allocate log file, spill log file, replica volume, and shadow copy volume sizes, both at the file server and at the data protection manager server. In one implementation, the file server or data protection manager server automatically determines volume allocation information and automatically provides this information to the data protection manager server. The data protection manager server can then compare the volume allocation information with identified characteristics of its storage mediums, and implements an appropriate, efficient backup policy.

7 Claims, 4 Drawing Sheets

U.S. PATENT DOCUMENTS

| | | | |
|---|---|---|---|
| 2003/0135609 A1* | 7/2003 | Carlson et al. | 709/224 |
| 2004/0225689 A1 | 11/2004 | Dettinger et al. | |
| 2005/0071336 A1 | 3/2005 | Najork et al. | |
| 2005/0138285 A1* | 6/2005 | Takaoka et al. | 711/114 |
| 2005/0160427 A1 | 7/2005 | Ustaris | |
| 2005/0182771 A1* | 8/2005 | Grubbs et al. | 707/100 |
| 2005/0198084 A1 | 9/2005 | Kim | |
| 2006/0117221 A1* | 6/2006 | Fisher et al. | 714/21 |
| 2006/0129562 A1* | 6/2006 | Pulamarasetti et al. | 707/10 |
| 2006/0155949 A1* | 7/2006 | Purushothaman | 711/170 |
| 2006/0242452 A1* | 10/2006 | Kaiya et al. | 714/2 |
| 2007/0130236 A1* | 6/2007 | Seeger et al. | 707/205 |
| 2007/0168321 A1* | 7/2007 | Saito et al. | 707/2 |

OTHER PUBLICATIONS

Juniper Networks: Optimizing Data Replication: How Juniper Networks Accelerates VERITAS Volume Replicator [online][retrieved on Feb. 3, 2006]. Retrieved from the Internet: URL: http://www.juniper.net/solutions/literature/solutionbriefs/351126.pdf.

Brocade Professional Services: Backup and Restore Stabilization: Data Protection and Recovery Solutions: [online][retrieved on Feb. 3, 2006]. Retrieved from the Internet: URL: http://www.brocade.com/san/pdf/datasheets/ServicesBURestore_DS_00.pdf.

Usinex: Geographically Distributed System for Catastrophic Recovery [online] [retrieved on Feb. 3, 2006]. Retrieved from the Internet: URL: http://www.usenix.org/events/lisa02/tech/full_papers/adams/adams_html.

\* cited by examiner

PROTECTING STORAGES VOLUMES WITH MOCK REPLICATION

CROSS-REFERENCE TO RELATED APPLICATIONS

N/A

BACKGROUND

Background and Relevant Art

As computerized systems have increased in popularity, so have the needs to store and back up electronic files and other communications created by the users and applications associated therewith. In general, computer systems and related devices create files for a variety of reasons, such as in the general case of creating a word processing document in a work setting, as well as creating a file used for more sophisticated database purposes. In addition, many of these documents can include valuable work product, or sensitive information that should be protected. One will appreciate, therefore, that there are a variety of reasons why an organization will want to backup electronic files on a regular basis, and thereby create a reliable restoration of an originally created file when needed.

One conventional system for backing up files in an organizational setting involves one or more client computer systems using a file server to create and manage electronic data files. The file server in turn is connected to one or more backup storage media. When users at the client computer systems create files, or modify the files in some way, the file server might log the new information (e.g., new file, or change in the file), and transmit the log of new information to the backup storage media.

Conventional backup storage media for larger organizations have typically included tape-based storage media, to which such data changes are written. This has been the case recently since tape-based media has typically been larger and less expensive than conventional optical (e.g., compact disc) and magnetic (e.g., hard disk) storage media. Thus, when synchronizing changes to the backup drive, the file system server typically transmits the log file of data changes to an attached tape drive. If the user needs the file at a later point, such as if the user accidentally deletes the file from the client computer system, an administrator can retrieve a recent copy of the file from the tape drive.

Unfortunately, tape drives can be less efficient to use in some cases compared with other types of storage media. In particular, tape drives tend to be much slower to write to (and read from) than a conventional optical or magnetic storage drive. For example, backup data written to tape is written on a position of the tape length, such that earlier-written data is at the beginning of the tape, and later-written data can be found at the end of the tape. Thus, if a user needs to access data found at the end of a given tape drive, an administrator of the backup tape drive will need to scroll through the length of tape to restore the requested file. This is known to be a fairly laborious, time-intensive process. As a result, optical and magnetic storage media, which are becoming much larger and more cost effective, are becoming more popular, at least in part since they are typically much faster to write to (and read from) than tape-based media. In particular, the ratio of cost to available size (as well as write and retrieval speed) has improved dramatically for optical and magnetic storage.

Nevertheless, there are other difficulties associated with using optical or magnetic media, which can also cause other types of problems for administrators. One such difficulty involves determining an appropriate log file size and replica volume size for the relevant optical or magnetic backup medium. For example, an administrator might have a large amount of backup storage space on a hard disk (e.g., magnetic media), but in order to use the space efficiently and cost-effectively over a long period of time, the administrator will want to maximize the number of volumes available on the hard disk. This means that the administrator might need to create multiple backup volumes on the disk, which are large enough to accommodate a certain amount or rate of growth over some predetermined time in a way that does not risk overflowing the backup volume size. As such, an administrator will typically make a "best guess" determination of how large to set a backup volume, and then manually reset that volume size as-needed.

Unfortunately, it is difficult for an administrator to determine at any given moment how fast a volume (that is intended for backup) is growing, and what size will ultimately be needed on the backup disk. This means that the administrator will make adjustments often only after overflow problems occur, and often only in the upward direction. Unfortunately, it can be an expensive process to revalidate a file server in case of under allocation. Furthermore, the volumes of some file systems can only be adjusted upward (i.e., on an increased capacity basis), rather than downward (i.e., on a diminished capacity basis). Setting volumes too high as a fail-safe measure, however, can result in a lack of efficient space usage, and, hence, overall inefficiencies in the backup system.

Accordingly, there are a number of inefficiencies in conventional data backup systems that can be addressed.

BRIEF SUMMARY

Implementations of the present invention overcome one or more problems in the art with systems, methods, and computer program products configured to automatically detect data change rates in a file server, and automatically apply such detections to backup policies in a data protection manager server. In particular, one implementation of the present invention involves monitoring change rates in a file server volume over a preset amount of time, calculating initial minimum and maximum backup volume sizes for that amount of time, and applying such calculations to a replica volume in a data protection manager server. Alternative implementations relate to using such calculations to efficiently allocate backup volumes across multiple storage media.

For example, a method from a file server perspective of simulating a protection mode to identify volume allocation information involves identifying one or more write operations in one or more protected volumes at a file server. In addition, the method from the file server perspective can include identifying a data write rate for the one or more protected volumes over a given time frame, and determining volume allocation information for a storage volume over the time frame. In at least one implementation, this determination can be based at least in part on the identified data write rate of the one or more protected volumes. Upon determining the volume B allocation information, the file server can allocate log file sizes locally either on its own or in response to commands from a data protection manager server, as well as send the volume allocation information to the data protection manager server.

By contrast, a method from a data protection manager server perspective can involve identifying volume allocation information for one or more protected volumes at a file server. The data protection manager server can then compare the received volume allocation information with an identified storage capacity and a read capacity of one or more storage mediums. The data protection manager server can also identify, based on the comparison with the received volume allocation information, that at least one of the storage mediums is appropriate for backing up one or more of the protected volumes at the file server. The data protection manager server can then automatically allocate one or more replica volumes on the identified appropriate storage mediums.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Implementations of the present invention extend to systems, methods, and computer program products configured to automatically detect data change rates in a file server, and automatically apply such detections to backup policies in a data protection manager server. In particular, one implementation of the present invention involves monitoring change rates in a file server volume over a preset amount of time, calculating initial minimum and maximum backup volume sizes for that amount of time, and applying such calculations to a replica volume in a data protection manager server. Alternative implementations relate to using such calculations to efficiently allocate backup volumes across multiple storage media.

As will be understood more fully herein, implementations of the present invention can simplify much of the administration that might otherwise be needed in backup storage administration. Such simplification can be found in at least one instance when a file server agent and replica agent use mock replication to automatically determine appropriate volume growth statistics in a protected volume, and then automatically allocate storage volumes according to those determinations. At least some of the advantages of such implementations are that backup administrators can avoid certain errors that can occur when attempting to fill volumes that are too small, and can better minimize unused storage space.

Figure 1:
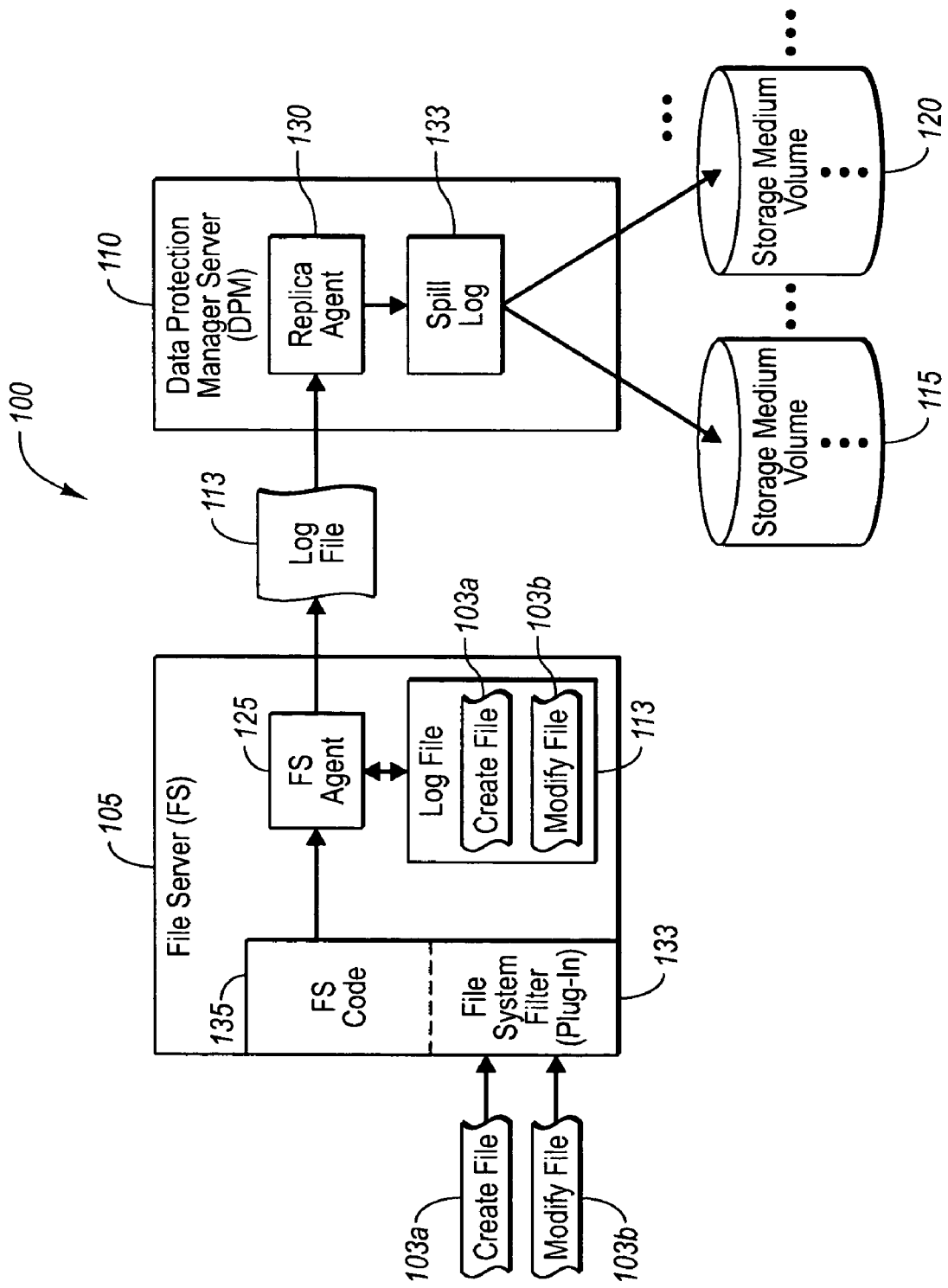
FIG. 1 illustrates a schematic overview diagram of a file server and data protection manager server in accordance with an implementation of the present invention.

FIG. 1 illustrates an overview schematic diagram of backup system 100, which implements data protection manager server 110 as a backup for file server 105 during a synchronization process. As shown, backup system 100 comprises a file server 105, which manages files created and modified by one or more client computer systems (not shown). File server 105, in turn, is connected to data protection manager ("DPM") server 110, which is further connected to at least storage mediums 115 and 120. Although storage mediums 115 and 120 typically include magnetic, disk-based storage media, one will appreciate that storage mediums 115 and 120 can also include any appropriate optical, flash, or even tape-based storage media, where appropriate.

In addition, FIG. 1 shows that file server 105 can include file server code 135, which can further include a file system filter ("FSF") plug-in 133 for monitoring "write" traffic (i.e., writes 103a-b). For example, a user creates a new word-processing file (e.g., file 103a), or modifies a previously-created word-processing file (e.g., file 103b). Alternatively, the user creates or modifies a spreadsheet file, a database file, a system file, or other application-specific file. If the file is one that is on a protected volume (not shown), then file server code 135, via plug-in 133, intercepts each write operation, and passes those intercepted write operations to log file 113 via file server agent 125.

At a later point, such as when file server 105 and data protection manager server 110 are ready to synchronize stored write operations (e.g., after a few minutes, hours, or days, etc.), file server agent 125 can pass log file 113 to replica agent 130 at data protection manager server 110. Replica agent 130, in turn, can perform a variety of functions, including allocating backup volumes among storage mediums 115, 120, etc., as well as delivery of write operations to the allocated backup volumes. For example, replica agent 130 receives log file 113 from file server 105, passes the contents of log file 113 to spill log 133, reads the change records (e.g., writes 103a-b), and delivers the change records to the appropriate backup volume.

In addition to passing data to an appropriate volume, replica agent 130 can also allocate backup volumes among storage mediums 115 and/or 120 in the first instance, based in part on statistical report 127 received from file server agent 125. In particular, report 127, which is generated at file server 105, and is discussed more fully below, can provide the basis for a number of storage allocations, including those for log files, spill log files, backup volumes, and shadow copy volumes.

Figure 2:
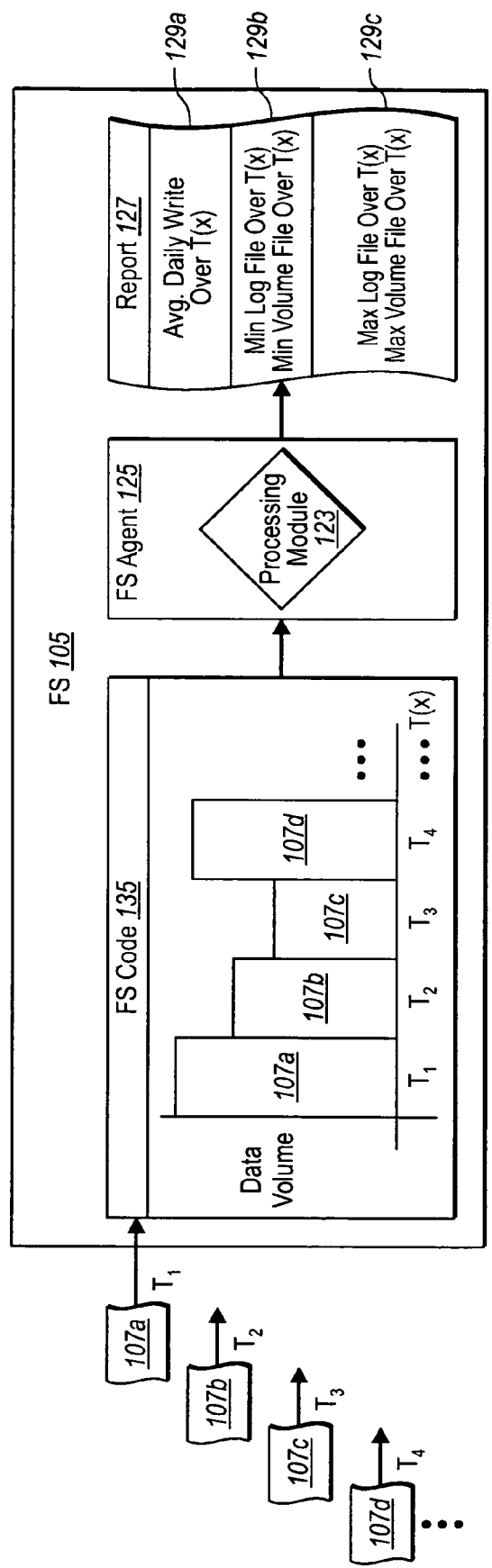
FIG. 2 illustrates a schematic overview diagram of a file server that implements a mock replication analysis in accordance with an implementation of the present invention.

FIG. 2 provides a schematic overview in which file server 105 generates report 127 when measuring write operations in "mock replication" mode. In mock replication mode, file server agent 125 does not necessarily capture or store the actual data of the write operations (e.g., writes 107a-d or writes 103a-b) to log file 113, as shown in FIG. 1, but rather, monitors at least the characteristics about the given write activity. That is, file server agent 125 can use file server code 135 to identify various amounts and rates of various write operations over a predetermined amount of time (i.e., "T(x)"). As shown in FIG. 2, for example, file server code 135 assembles data associated with write operations 107a-d, such as data size, date and/or time created, file location, and so forth, and passes this data to processing module 123.

Processing module 123 at file server agent 125 can then calculate such data as the average amount of data written during the selected time ("T(x)"), as well as the rate of change in the overall protected data volume (not shown) during that time. For example, processing module 123 might determine that the protected volume is growing at a rate of about 1 gigabyte per week, and roughly 140 to 150 megabytes per day. During that time, the volume might further experience a high growth of about 200 megabytes in one day, and a low growth of about 120 megabytes in another day. File server agent 125 can also monitor more or less granular data, such as the absolute amount of data written over a half hour, several hours, or several days on a protected volume at file server 105.

Figure 3:
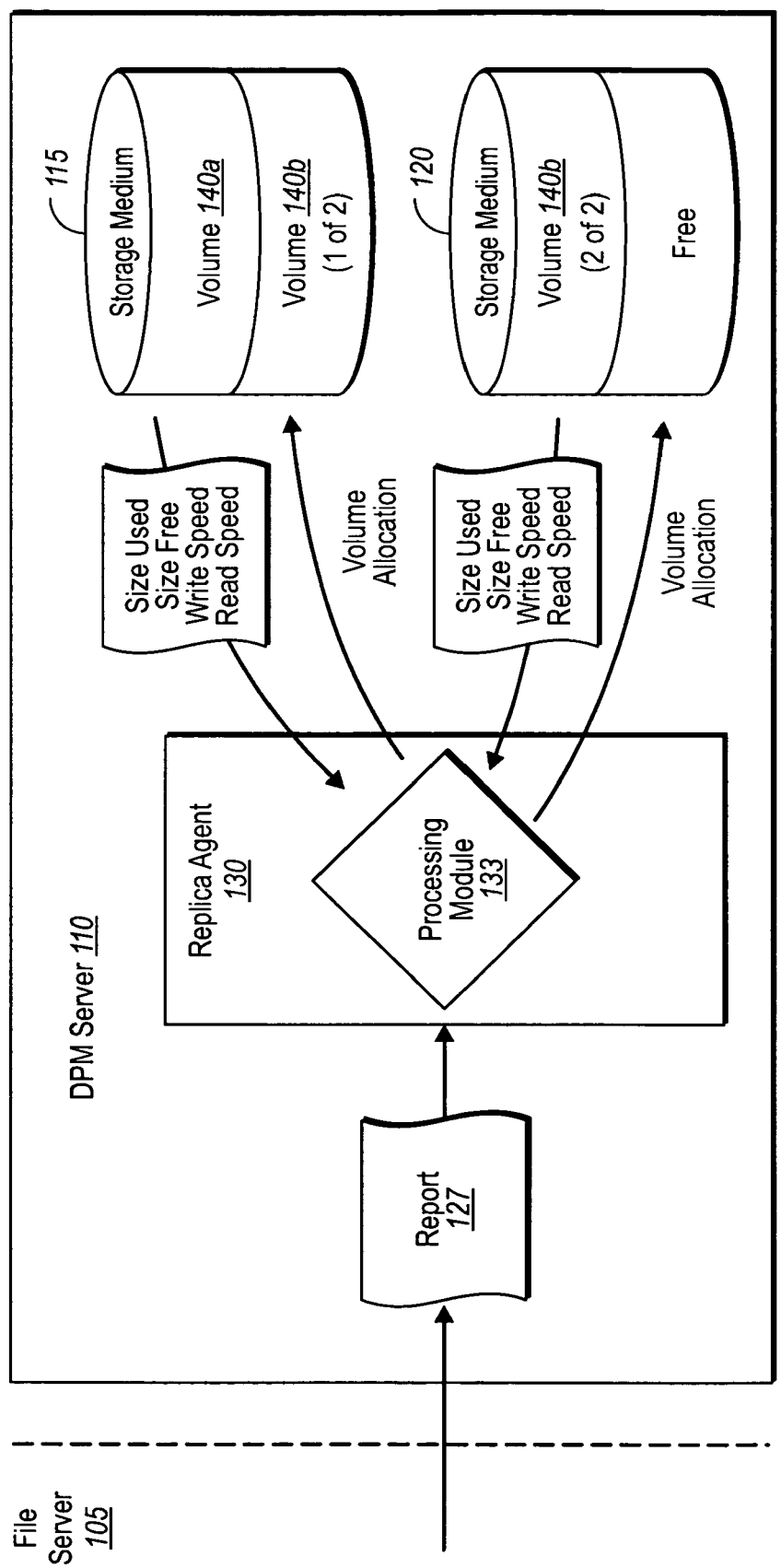
FIG. 3 illustrates a schematic overview diagram of a data protection manager server configured to allocate backup volumes in accordance with a report generated at the file server using mock replication, in accordance with an implementation of the present invention.

File server agent 125 can further consider other factors (such as based on user input or based on historical trends), which indicate that this week was slower than normal, or faster than normal in growth rate. For example, while the protected volume grew in the above example at a rate of 1 gigabyte per week, it might be determined that all other protected volumes (not shown) at file server 105 might grow at about 500 megabytes per week. Alternatively, the other protected volumes might involve much larger data files and related changes, and thus be capable of growing at rates of 3 to 4 gigabytes per week. Regardless of these variances, file server agent 125 can take these and other multiple factors into account and generate report 127. In particular, FIG. 3 shows that report 127 can comprise field 129a for average daily write, field 129b for a suggested minimum log and backup volume size, as well as field 129c for a suggested maximum log and backup (or "replica") volume size. Report 127 can also include fields (not shown) for suggested spill log 133 and shadow copy volume sizes to be used at data protection manager 110.

As a preliminary matter, the active components and resources described herein (e.g., agents, processing modules, filters, etc.) are illustrated as operating primarily at either file server 105 or data protection manager server 110 for descriptive convenience. Whether file server 105 or data protection manager 110 singly performs a particular function, however, is not necessarily required to accomplish an ultimate result. For example, file server agent 125 could generate report 127 at file server 105, or a similar processing agent at data protection manager server 110 (e.g., module 133, FIG. 3) could take the same information described above and generate report 127, or generate other related volume allocation information (e.g., related log size determinations).

As well, a processing module at file server 105 could make such determinations after receiving appropriate instructions from data protection manager 110; and, vice versa, an appropriate processing module at data protection manager 110 might make these calculations in response to instructions from file server 105. Thus, the calculations and determinations made herein could be made exclusively at one server or another, or could be made in part at one server, with the remainder made at another server.

In any event, and however or wherever created, report 127 can simply be read as a text report, and implemented manually by the backup server administrator. The backup server administrator might read report 127 and might use this data to set appropriate parameters for the various log and volume sizes through an appropriate user interface (not shown). For example, if logs (i.e., log file 113 and spill log 133) are synchronized every 3 hours, the backup server administrator might set a minimum log file size at file server 105 (and corresponding spill log 133 size at data protection manager 110) of roughly about 20 megabytes per synchronization for this protected volume (i.e., 1 gigabyte/7 days * 3 hours/24 hours per day =roughly 20 megabytes. Alternatively, the backup server administrator might set a maximum log file size of about 25 megabytes per 3 hour synchronization of this protected volume (i.e., 200 megabytes, or the largest amount of writes on any given day * 3/24).

In addition and along similar lines, report 127 can also be implemented at data protection manager server 110. As shown in FIG. 3, for example, file server 105 passes report 127 directly to replica agent 130 at data protection manager 110. (Alternatively, data protection manager 110 generates report 127 based on raw data received from file server 105). Replica agent 130 can then automatically use the data from report 127 in conjunction with other data identified regarding used and free space from storage mediums 115, 120, as well as read and write rate data.

For example, processing module 133 of replica agent 130 can determine that the above-described protected volume at file server 105 will grow at about 1 gigabyte per week. Having also identified that storage medium 115 comprises about 100 gigabytes of usable space, and further having identified that each volume will be recycled (such as with another storage medium) once a year, replica agent 130 can then set volume 140a as the replica (or "backup") volume. Furthermore, replica agent 130 allocates about 52 gigabytes of space for the replica of the protected volume at file server 105, which corresponds in this case to just over half of the possible space on storage medium 115.

To minimize the amount of unused free space per storage medium replica agent 130 can also set other volumes (e.g., 140b) on any given storage medium. These various, additional allocations can still be subject to parameters provided in other reports (not shown) sent from file server 105 for other protected volumes, each report indicating a needed minimum/maximum storage space, as well as write rate for a protected volume. In this example, FIG. 3 shows that replica agent 130 has also allocated volume 140b on storage medium 115 and on 120 due to spill over in storage needs. Generally, volume 140b might also correspond to a backup, or replica, of a different protected volume at file server 105, as with volume 140a, but can also correspond to storage for spill log 133, as well as for a shadow copy volume that corresponds to the replica of volume 140a.

In general, a shadow copy volume represents all of the changes between two copies of the same replica volume at different points in time. Thus, a shadow copy volume will generally have the same types of constraints that need to be considered in backup volume allocation as the replica volume to which it corresponds. As mentioned, these characteristics are typically free space and write rate considerations. As such, replica agent 130 will generally allocate a shadow copy volume on the same or similarly-characterized storage medium where the replica agent 130 has allocated a volume for the corresponding replica based on available free space and write rate.

One will appreciate, however, that replica agent 130 can take into account a variety of considerations for different types of information sets that are to be protected and/or managed at data protection manager server 110. For example, in addition to allocating replica and shadow copy volumes among one or more storage mediums based on performance (i.e., write rate) and capacity (i.e., free space), replica agent 130 might also allocate different volumes on the same or different storage mediums based also on read rate considerations. For example, performance is more of a concern for replica and shadow copy volumes, while space is typically a more important concern for log files such as spill log 133. Accordingly, replica agent 130 will typically allocate one or more volumes for spill logs where there-is maximum free space available, but at least sufficient (rather than maximum) write rate, and/or read rate.

As such, the volume allocations for the spill log, replica volumes, and shadow copy volumes can differ by any number of factors. As understood from the discussion and drawings of this description, these differences can be considered by the backup administrator manually, or by replica agent 130 automatically, when VZ determining how and where to allocate volumes at the various storage mediums (e.g., 115, 120). The backup administrator and/or replica agent 130 (also file server agent 125) will then want to make these various determinations and/or allocations based on a variety of efficiency and performance considerations.

Allocating set sizes for the various log and replica volumes at data protection manager server 110 based on report 127 is simply one implementation for accomplishing goals in accordance with the present invention. In alternative implementations, the backup administrator can manually (or automatically through the use of replica agent 130) allocate much smaller replica sizes than recommended for the maximum over some time, based on minimum write rates at the corresponding protected volume. For example, the backup administrator can allocate a volume on one or more storage mediums (e.g., 115, 120) that grows dynamically in response to write rates continually received via reports (e.g., 127, etc.) received from file server 105. Thus, in a prior example, rather than allocating volume 140a for 52 gigabytes of space in the above-described example, the backup administrator might set an initial volume size of about 2 gigabytes, which grows by several hundred megabytes each week in accordance with variances in volume size detected through continually generated reports 127.

Accordingly, FIGS. 1 through 3 and the corresponding text provide schematics and descriptions of a variety of implementations for automatically determining volume data growth rates schematics, and for implementing such determinations with measured volume allocation at a data protection manager server. Implementations of the present invention can also be described in terms of methods comprising one or more acts for accomplishing a particular result. In particular, FIG. 4 illustrates flowcharts of methods from the perspectives of file server 105 and data protection manager 110, respectively, for implementing replica or backup management policies based on volume allocation determinations.

Figure 4:
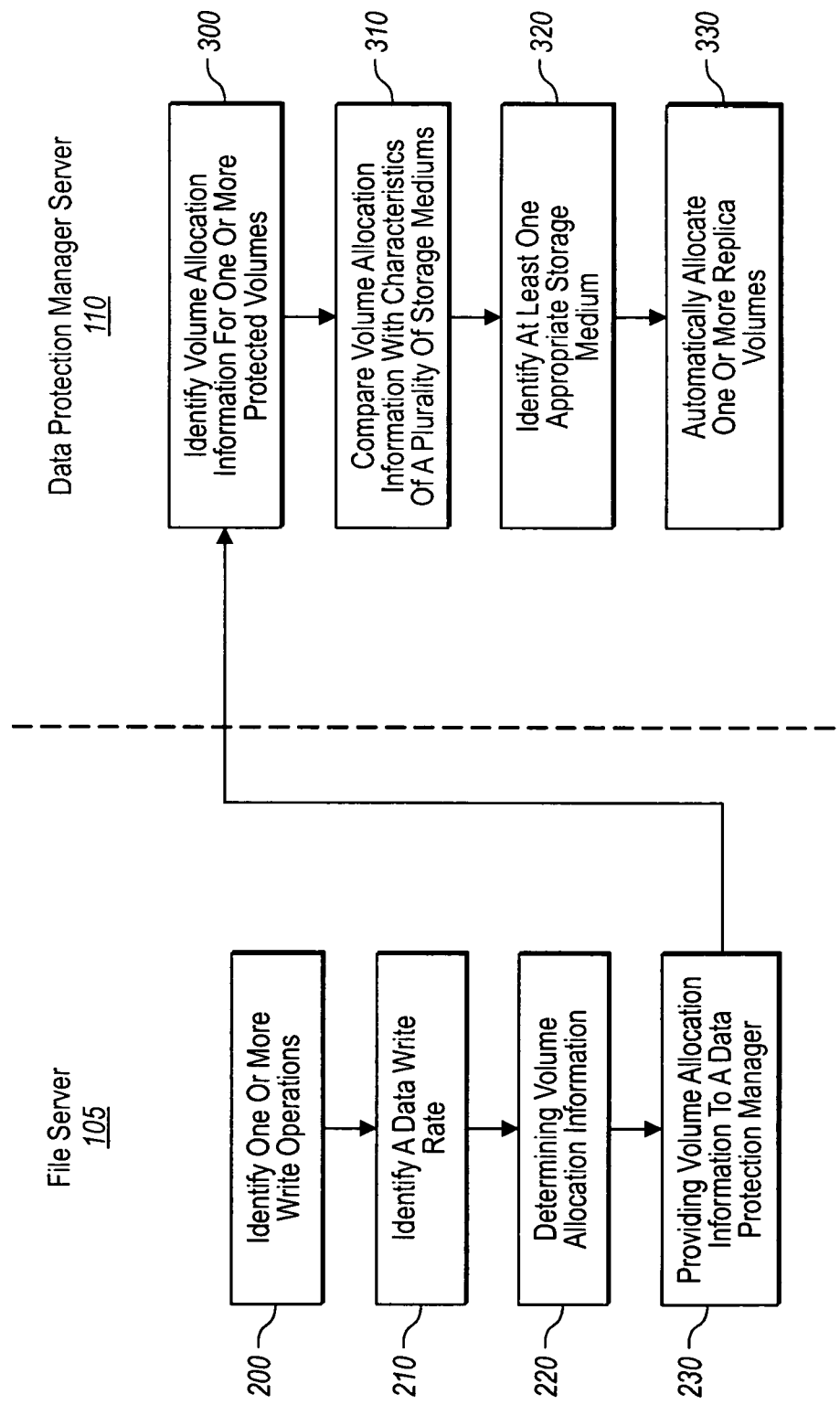
FIG. 4 illustrates flow charts of methods from the perspectives of a file server and a data protection manager server, respectively, for implementing volume allocation and protection policies based on observations made during a mock replication process.

For example, FIG. 4 shows that a method from the perspective file server 105 comprises an act 200 of identifying one or more write operations. Act 200 includes identifying one or more write operations in one or more protected volumes at a file server. For example, file server 105, via file server code 135, monitors characteristics of write operations 103a-b (or write operations 107a-d) to a protected volume, rather than reading and/or receiving the actual data associated with the given write operation.

FIG. 4 also illustrates that the method from the file server 105 perspective comprises an act 210 of identifying a data write rate. Act 210 includes identifying a data write rate for the one or more protected volumes over a time frame. For example, a system backup administrator inserts a time value (e.g., "T(x)", FIG. 2) over which the administrator would like to monitor data regarding the change rate for write operations, such as over several minutes, days, weeks, or months, etc. In one implementation, this time value corresponds to a frequency with which the administrator would like to synchronize backups of a protected volume. File server agent 125, in turn, counts the frequency (and size) of write operations over that time to determine at least the data change rate for the corresponding one or more protected volumes. Alternatively, a similar component at data protection manager server 110 determines the write rate information and supplies this information to file server 105. File server 105 then identifies the write rate information from one or more reports received from data protection manager 110.

In addition, FIG. 4 shows that the method from the perspective of file server 105 can comprise an act 220 of determining volume allocation information. Act 220 includes identifying volume allocation information for a storage volume over the time frame based on the identified data write rate of the one or more protected volumes. For example, file server agent 125 can proposes (i.e., from the identified change rate) minimum and/or maximum sizes for log files, as well as replica and shadow copy volume sizes that can be implemented at file server 105 and data protection manager server 110. Alternatively, a similarly configured component at data protection manager 110 can submit commands to file server agent 125, which indicate how to allocate volume sizes based on the identified write rates. As well, the data protection manager 110 (e.g., via processing module 133) could determine the minimum and/or maximum sizes for the various log files, and pass these determinations to file server agent 125 at file server 105.

Accordingly, FIG. 4 also illustrates that the method comprises an act 230 of providing volume allocation information to a data protection manager. Act 230 includes providing the determined volume allocation information to a data protection manager. For example, file server 125 sends report 127 to replica agent 130 at data protection manager server 110, where report 127 includes volume allocation information. In alternatively implementations, however, data protection manager 110 receives only raw data related to read and/or write rates from file server 105, and then generates report 127, which it can then use to allocate volumes.

However the volume allocation information is identified, FIG. 4 further illustrates that a method from the perspective of data protection manager server 110 for implementing a protection policy can comprise an act 300 of identifying volume allocation information for one or more protected volumes. Act 300 includes receiving volume allocation information for one or more protected volumes at a file server. For example, replica agent 130 receives automatically one or more generated reports (e.g. 127) from FS agent 125 (or generated at a component of data protection manager 110), which comprises volume allocation information (e.g., change rate information for one or more protected volumes) received from monitoring various write operations to file server 105.

In addition, FIG. 4 also shows that the method from the perspective of data protection manager server 110 comprises an act 310 of comparing the volume allocation information with characteristics of a plurality of storage mediums. Act 310 includes comparing the received volume allocation information with a storage capacity and a read capacity of a plurality of storage mediums at a data protection manager server. For example, replica agent 130 identifies various data change rates from each report received (e.g., report 127, as well as any other received reports), as well as suggested minimum and maximum log and replica volume sizes, and compares this data with storage capacity, as well as at least the read capacity, of storage mediums 115, 120.

In addition, FIG. 4 shows that the method from the data protection manager 110 perspective comprises an act 320 of identifying at least one appropriate storage medium. Act 320 includes identifying, based on the comparison, that at least one of the plurality of storage mediums is appropriate for storing one or more replicas of the one or more corresponding protected volumes at the file server. For example, replica agent 130 determines that storage medium 115 has a capacity of 100 gigabytes, and that the protected volume described by report 127 will grow to a little over 50 gigabytes per year. Furthermore, replica agent 130 identifies that storage medium 115 has a faster write rate than storage medium 120. Accordingly, replica agent 130 allocates approximately half of storage medium 115 for volume 140a, which is used to storage one or more of the protected volumes described in report 127.

FIG. 4 also shows that the method from the data protection manager server 110 perspective comprises an act 330 of automatically allocating one or more replica volumes. Act 330 includes automatically allocating one or more replica volumes on the identified at least one of the plurality of storage mediums at the data protection manager server. For example, replica agent 130 determines that volume 140a, which needs a fast write rate and large storage capacity, to be allocated on storage medium 115. Alternatively, replica agent 130 might also determine that storage medium 120 has a slower write rate, and a sufficient read rate, but plenty of storage capacity. Replica agent 130 might further determine that this volume is being allocated for a log file. As such, replica agent 130 allocates volume 140b over storage mediums 115 and 120.

Accordingly, the methods and schemas described herein provide a number of advantages in file server backup administration. In particular, implementations in accordance with aspects of the present invention relieve much of the hassle commonly associated with determining appropriate sizes and finding ways to allocation appropriately-sized backup volumes. These advantages can provide a much more efficient operating environment, at least in part since volumes can be allocated quickly and efficiently across multiple storage mediums including, but not limited to, any optical and magnetic-based disk drives, in addition to the conventional tape-based backup sources.

The embodiments of the present invention may comprise a special purpose or general-purpose computer including various computer hardware, as discussed in greater detail below. In particular, embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method performed within a file server in which the file server is configured to transmit data changes to a storage medium of a data protection manager server, the method simulating a protection mode at the file server to identify volume allocation information, wherein an adequate protection policy is made automatically for one or more protected volumes, the method comprising:

executing a file system filter at the file server by:
monitoring write operations to data storage volumes at the file server;
intercepting one or more of the monitored write operations at the file server;
passing each of the intercepted one or more of the monitored write operations to a log file;
identifying one or more write operations in the log file which occur in the one or more protected volumes at the file server;
identifying a data write rate for the one or more protected volumes over a time frame, the identified data write rate comprising both a number of write operations over the time frame and a total amount of data written over the time frame;
determining a frequency of write operations over the time frame using the identified data write rate;
determining a size of write operations over the time frame using the identified data write rate;
determining an absolute amount of data written over the time frame using the identified data write rate;
determining a data change rate for at least one of the one or more protected volumes, the determined data change rate being a statistical measure based at least upon the determined frequency of write operations over the time frame, an average size of write operations over the time frame derived from the determined size of write operations, and a growth rate for the one or more protected volumes derived from the determined absolute amount of data written;
determining volume allocation information for a storage volume based at least in part on the identified data write rate and the determined data change rate of the at least one or more protected volumes; and
providing a report of the determined volume allocation information to the data protection manager server, the provided report comprising fields derived from the determined volume allocation information for spill log size, a shadow copy volume size, a daily write rate, a backup volume size, and a log size.

2. The method as recited in claim 1, wherein the identifying the one or more write operations in the log file comprises an act of identifying a time, a date, and a size of the intercepted one or more of the monitored write operations without logging contents of the intercepted one or more of the monitored write operations into the log file.

3. The method as recited in claim 1, wherein the identifying the write rate for the one or more protected volumes over the time frame further comprises acts of:

receiving input regarding a time interval for measuring write activities at one of the one or more protected volumes; and calculating a size of total writes to the one of the one or more protected volumes over the time interval.

4. The method as recited in claim 1, wherein the determined volume allocation information further comprises values corresponding to a minimum log file size and a maximum log file size.

5. The method as recited in claim 1, wherein the determined volume allocation information further comprises values corresponding to a minimum replica volume size and a maximum replica volume size.

6. The method as recited in claim 1, further comprising acts of:

identifying a synchronization frequency for the time frame;

allocating a minimum log file size; and sending a recommended spill log file size to the data protection manager server.

7. The method as recited in claim 1, further comprising an act of allocating a log file size at the file server based on the determined volume allocation information, wherein the determined volume allocation information is determined at the file server in response to one or more commands received from the data protection manager server.

* * * * *

UNITED STATES PATENT AND TRADEMARK OFFICE
CERTIFICATE OF CORRECTION

| | | |
|---|---|---|
| PATENT NO. | : 7,778,959 B2 | Page 1 of 1 |
| APPLICATION NO. | : 11/298816 | |
| DATED | : August 17, 2010 | |
| INVENTOR(S) | : Robert M. Fries et al. | |

It is certified that error appears in the above-identified patent and that said Letters Patent is hereby corrected as shown below:

Title page, in field (54), under "Title" column 1, line 1, delete "STORAGES" and insert -- STORAGE --, therefor.

In column 1, line 1, delete "STORAGES" and insert -- STORAGE --, therefor.

Signed and Sealed this
Tenth Day of May, 2011

David J. Kappos
*Director of the United States Patent and Trademark Office*